United States Patent [19]
Booth et al.

[11] Patent Number: 5,555,531
[45] Date of Patent: Sep. 10, 1996

[54] METHOD FOR IDENTIFICATION OF NEAR-SURFACE DRILLING HAZARDS

[75] Inventors: James R. Booth; Michael C. Jacobi, both of New Orleans; Arlette C. Nunez, St. Bernard; Jonathan S. Smith, LaPlace; Peter R. Tauvers, New Orleans, all of La.; Earl H. Doyle, Jr., Sugar Land; Fredric A. Diegel, Jr., Bellaire, both of Tex.; Thomas M. Kratochvil, Metaire; Brenda G. Gaudin, New Orleans, both of La.

[73] Assignee: Shell Oil Company, Houston, Tex.

[21] Appl. No.: 358,429

[22] Filed: Dec. 19, 1994

[51] Int. Cl.$^6$ ............................................... G01V 1/28
[52] U.S. Cl. ........................................ 367/15; 367/73
[58] Field of Search ................................ 367/15, 20, 21, 367/38, 73, 14; 364/421

[56] References Cited

U.S. PATENT DOCUMENTS

| | | | |
|---|---|---|---|
| 4,821,164 | 4/1989 | Swanson | 364/420 |
| 4,912,682 | 3/1990 | Norton, Jr. et al. | 367/19 |
| 4,924,449 | 5/1990 | Guigne | 367/104 |
| 5,005,418 | 4/1991 | Anderson | 73/625 |
| 5,029,145 | 7/1991 | Marsden et al. | 367/56 |
| 5,056,066 | 10/1991 | Howard | 367/72 |
| 5,235,556 | 8/1993 | Monk et al. | 367/63 |
| 5,251,184 | 10/1993 | Hildebrand et al. | 367/72 |
| 5,257,242 | 10/1993 | Clawson | 367/38 |
| 5,268,994 | 12/1993 | Keskes | 395/121 |
| 5,274,605 | 12/1993 | Hill | 367/53 |
| 5,281,773 | 1/1994 | Duren | 181/111 |
| 5,285,422 | 2/1994 | Gonzalez et al. | 367/53 |
| 5,313,567 | 5/1994 | Civanlar et al. | 395/124 |

OTHER PUBLICATIONS

Isa et al, "Integration Of 3-D And Site Survey Seismic Data In Analysis Of Near-Surface Hazards To Platform Location At Dulang Field, Malay Basin", Geol. Soc. Malaysia, Bulletin 32, Nov. 1992, pp. 165–184.

Austin et al, "The Use Of 3D Seismic Data For Evaluation Of Drilling Hazards At Heidrun, Haltenbanken", Proc. 55th EAEG Meeting, Jun. 1993.

*Primary Examiner*—Ian J. Lobo
*Attorney, Agent, or Firm*—Del S. Christensen

[57] ABSTRACT

A method is disclosed to identify existence of near-surface drilling hazards in the vicinity of a sea floor location comprising the steps of: obtaining 3D seismic data for the seafloor in the vicinity of the sea floor location; preparing high resolution 3D vertical profiles from the 3D seismic data; preparing an artificially-illuminated rendered surface based on the 3D seismic data; and identifying existence of near-surface hazards in the vicinity of the sea floor location by visual analysis of the rendered surface with reference to the high resolution 3D vertical profiles. Deep tow and geohazard surveys, which are expensive and time consuming are not required in the practice of the present invention. 3D seismic surveys that are used in the practice of the present invention have often been prepared for other purposes.

12 Claims, 3 Drawing Sheets

METHOD FOR IDENTIFICATION OF NEAR-SURFACE DRILLING HAZARDS

FIELD OF THE INVENTION

This invention relates to a method for determining if surface or near-surface drilling hazards exist at a subsea location.

BACKGROUND OF THE INVENTION

Prior to drilling a wellbore, a study must be made to determine if geological conditions exist that could render the location hazardous for drilling. On land, data for this study may be easily obtained by coring and surface mapping. For a subsea location, it is more difficult and costly to obtain data necessary for such a study. Typically, a combination of a deep towed side scan sonar/sub-bottom profiler survey and a geohazard survey are performed. The deep tow survey data is utilized to map surface and near surface characteristics. The geohazard survey is used to obtain fathometer data to produce a contour map and sparker data to obtain further details about the near sea floor geology. This hazard analysis is required as a sound drilling practice and often as a regulatory prerequisite. Hazards that could affect wild-cat drilling include surface faults, debris slides, landslides, mudflows, salt structures, fluid expulsion features, carbonate build-ups, and shipwrecks and other man made obstructions. For drilling a wellbore for long-term operations, buried landslides could also be significant, but for wild-cat or evaluational drilling, movement of a buried landslide would be sufficiently slow that the purpose of the wellbore would be fulfilled prior to a failure of the well due to the buried landslide.

A near-surface hazard analysis is typically performed by obtaining the two survey data sets, constructing models of surface and near-surface geology, and then studying the morphology for indications that one of the formation hazards may exist, and then studying the near-surface geology to determine if the indications evident from the surface model actually represent a hazard.

Although it has not been common practice, sparker data have recently been replaced with high resolution 3D seismic data. A seismic survey incorporates initiating a shock wave above a subsea surface and recording signals reflected from subsurface discontinuities as a function of time. Continuous interfaces between subsurface rock layers can be found as a function of shock wave travel time by matching signal patterns received at various receiver locations. The nature of reflected signals are indicative of the nature of the various rock layers. By using the information obtained from the reflected signals, velocities for the signals through individual layers are estimated, and the estimated velocities are used to convert time data into the depth estimates.

3D seismic involves collecting data along a plurality of lines at one time. The lines are typically acquired one hundred to three hundred feet apart. With 3D seismic data, a considerably more complete understanding of subsurface features can be achieved.

Sources used to initiate shock waves having a range of frequencies. Relatively low frequency shock waves are needed to obtain data from deep within the formation. High frequency data is useful in determination of geological characteristics but is difficult to maintain below about two to three seconds below the mudline. The mudline is defined as the top of the sea floor, and the terms sea floor and mudline will be used interchangeably herein. "High resolution" seismic data is obtained by enhancing of the high frequency responses. Commercially available computer programs such as CogniSeis FOCUS software and Landmark ITA/Advance software may be used to obtain this high resolution data.

Maps based on high resolution seismic data may be prepared using other commercially available software such as ZYCOR and a plotter such as a Versatec plotter.

It is therefore an object of the present invention to provide a method to identify near-surface hazards wherein 3D seismic data is used to provide a surface rendering that is useful to identify geological features that could represent drilling hazards, and high resolution 3D seismic interpretation is used to further analyze those features to identify existence or absence of near-surface drilling hazards for prospective drilling sites that are not in a geologically complex area. It is a further object to provide such a method wherein deep tow and geohazard surveys are not required.

SUMMARY OF THE INVENTION

These and other objects are accomplished by a method to identify existence of near-surface drilling hazards in the vicinity of a sea floor location, the method comprising the steps of:

obtaining 3D seismic data for the seafloor in the vicinity of the sea floor location;

preparing a high resolution 3D vertical profile from the 3D seismic data;

preparing an artificially-illuminated rendered surface based on the 3D seismic data; and identifying existence of near-surface hazards in the vicinity of the sea floor location by visual analysis of the rendered surface with reference to the high resolution 3D vertical profiles.

In this method, 3D seismic data is used to perform a drilling hazards study without the need for obtaining deep tow or geohazard data. 3D seismic data is typically available for prospective drilling sites, and considerable time and money is saved with the practice of the present invention. This method is particularly beneficial for prospective drilling in water of greater than about 800 feet in depth because water of about this depth is required for obtaining a robust water-bottom event.

Figure 1:
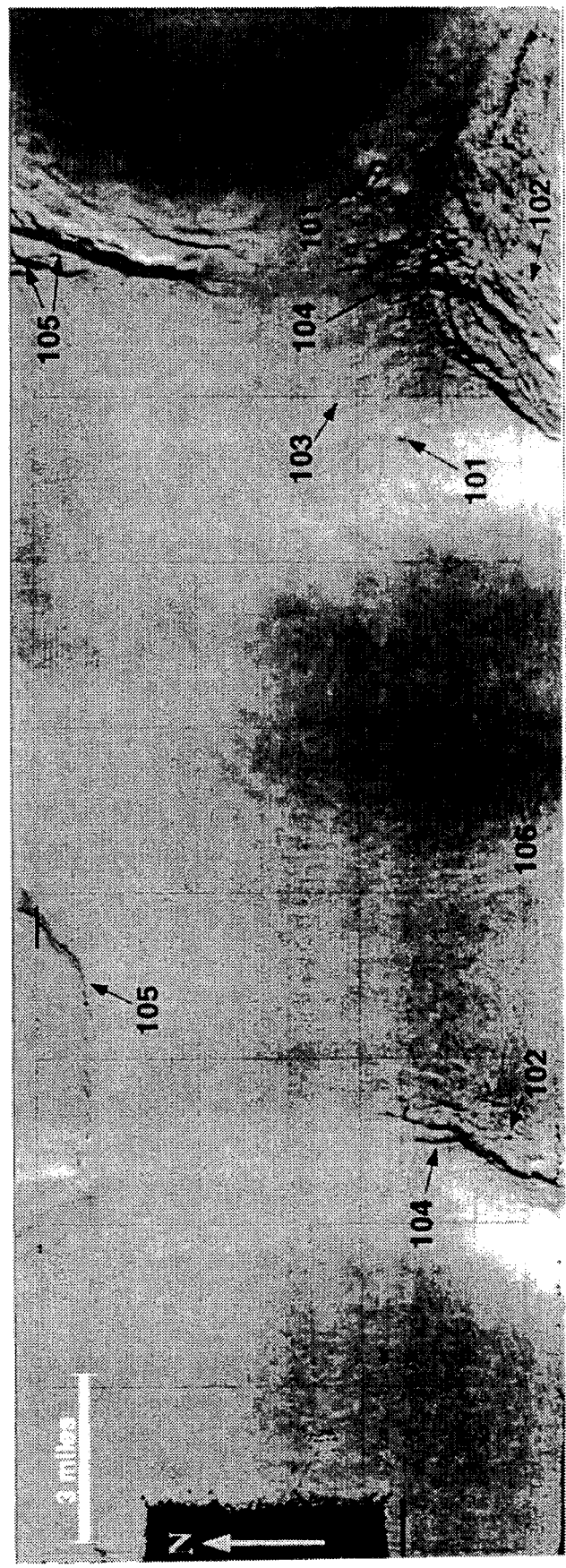
FIG. 1 is a typical artificially illuminated rendered surface prepared for use in a near-surface hazard analysis using grey shading.

DETAILED DESCRIPTION OF THE INVENTION 3D seismic data is obtained as an initial step in the present invention by methods well known in the art. This data has likely been collected in the vicinity of a drilling prospect. Several geophysical service companies such as, for example, Western, Geco and Digicon, are capable of collecting this data. This 3D seismic data is further processed according to the present invention to obtain at least one high resolution seismic vertical profile, and an artificially illuminated rendered surface image. At least one of the seismic vertical profiles is preferably through the prospective drilling site. The high resolution seismic vertical profile and the artificially illuminated rendered surface image are used together to determine the presence or absence of near-surface drilling hazards in the vicinity of a drilling site. Preferably a grid of several vertical profiles is developed so that features can be more fully understood based on the profiles.

The present invention is best practiced in conjunction with a potential drilling site that is more than about 800 feet below mean sea level. In shallower water, it is difficult to obtain shallow 3D seismic data acceptable for high frequency enhancement. The present invention is also best practiced in conjunction with a potential drilling site where the sea floor is of a slope of less than about 5° and not a geologically "complex" surface. When the sea floor is of a greater slope than about 5° or a geologically complex surface, the present method may be utilized along with other information to obtain a complete understanding of potential near-surface hazards, but a significant advantage of the present invention, avoidance of performing deep tow and geohazard surveys, is not likely to be achievable.

High resolution seismic profiles are preferably obtained by first subsetting the 3D seismic data into a data set that represents only responses that are less than about two to three seconds below the mudline. Subsetting the data reduces the volume of data to be processed, and focuses on the interval of interest for a shallow hazard study.

The subsetted seismic data is enhanced by high-frequency boost and whitening methods that are well known in the art. Software that is capable of such high-frequency boost and whitening includes CogniSeis FOCUS software and Landmark ITA/Advance software. The high resolution profiles may be displayed and hard copies produced using software such as ZYCOR available from Landmark.

Seafloor and subseafloor images that contain sufficient detail for the practice of the present invention can be constructed from 3D seismic data. These images can be constructed by first picking a loose grid and then applying an auto-picker to compile a dense grid of points. The dense grid provides sufficient detail to clearly show where near surface drilling hazards may be located in the subsequently produced artificially illuminated rendered surface. From the dense grid of points, the seismic data is converted from time to elevation and amplitude data using known methods and then base maps and contour maps can be created using software such as ZYCOR.

An important aspect of the present invention is that artificially illuminated rendered surfaces are created from seismic data to provide a starting point for identifying potential near-surface drilling hazards. Artificial illumination allows for display of a level of detail that contour maps or other methods of display are not capable of revealing. Artificially illuminated rendered surfaces can be prepared for the sea floor, and for significant horizons near the sea floor. Generally, near surface drilling hazards are of within about 2000 feet of the sea floor.

Artificially illuminated rendered surfaces can also be prepared based on the amplitudes of reflected seismic signals. The advantages of creating such artificially illuminated rendered surfaces parallel that of the contour surfaces. Significantly more detail can be displayed and therefore used to identify and understand potential near surface drilling hazards.

Commercially available software capable of creating artificially illuminated renderings from dense sets of data include ER-MAPPER, and ENVI Image Processing. Hard copies of such renderings may be obtained using printers such as Tektronics 300 dpi dye-sublimation printer. Referring now to FIG. 1, an example of an artificially illuminated rendered surface is shown with grey shading to indicate light from the left (west) at a 37° angle with vertical dimensions exaggerated by a factor of five. Examples of features that are apparent from this figure include gas volcanos, 101, salt highs, 102, debris flows, 103, erosion from dense salt brine, 104, faults, 105, and a basin, 106. It can be seen that a contour map would not be likely to make these features as apparent as they appear in this figure.

Artificially illuminated renderings and the high resolution seismic sections are interpreted by means known in the art to identify near-surface drilling hazards. This interpretation is performed in a manner similar to near-surface drilling hazard studies based on deep tow and geohazard data. Near-surface drilling hazards include, but are not limited to surface faults, debris slides, landslides, mudflows, salt structures, expulsion features, and carbonate build-ups. Each of these hazards could result in a wellbore failing prior to the goals of a well being accomplished.

Results of a near-surface drilling hazard analysis are typically displayed on a map or overlays to a map for easy understanding of the importance of each potential hazard to a drilling site at all proposed locations.

If a wellbore is drilled for long-term production development, study beyond the scope of the present invention may be required due to the possibility of hazards such as buried landslides, shipwrecks and man-made hazards which may not be identified with the use of the present invention. The present invention is therefore not preferably practiced in conjunction with installation at development facilities.

EXAMPLE

Figure 2:
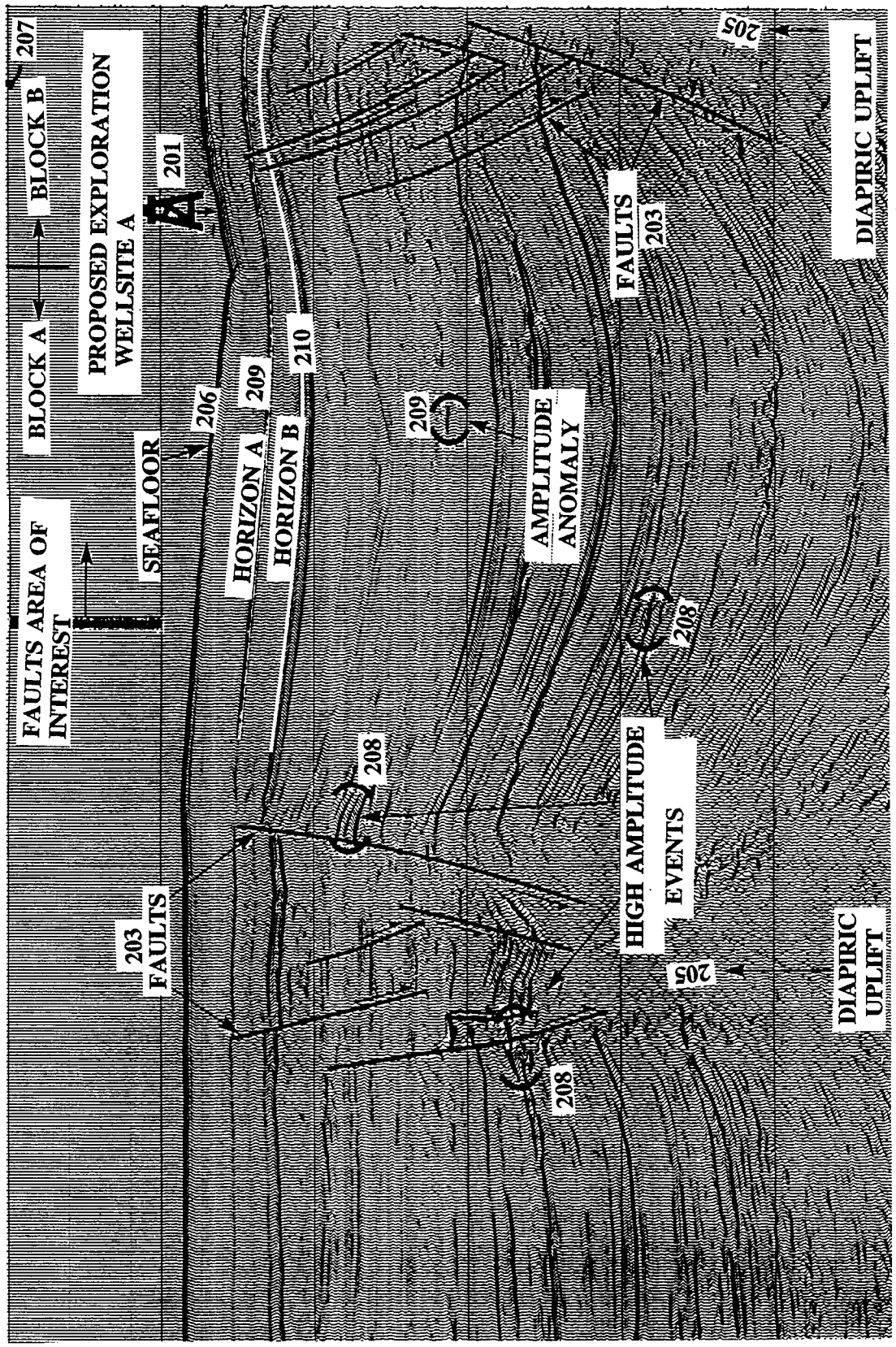
FIG. 2 is a high-resolution seismic cross-section passing near a proposed well site.

A near-surface drilling hazard analysis was completed and accepted by the Gulf of Mexico Minerals Management Service as complying with specifications for shallow hazards assessments detailed in MMS publication NTL 83-3 and NTL 88-11. This analysis is detailed in "Shallow Hazards Report Blocks 109 and 110, Green Canyon Area Gulf of Mexico," submitted by Shell Offshore Inc. on Jan. 14, 1994, and on file with U.S. Department of Interior, Gulf of Mexico Minerals Management Service. FIG. 1 and FIG. 2 are copies of plates from this Report.

Referring now to FIG. 2, a high resolution seismic section near the proposed well site is shown. This section was prepared from 3D seismic data that has been truncated below 3 seconds and modified with a high-frequency enhancement and whitening. A proposed well site, 201, is shown on a seafloor, 206, below the mean sea level, 207. Faults, 203, are depicted around diapiric uplifts, 205. High amplitude events, 208, are evident along with an amplitude anomaly, 209. A time scale, on the left, is provided, and an approximate depth scale is shown on the right. Thirty eight sections, such as FIG. 1, were prepared along with fourteen sections perpendicular to the first thirty eight. Two subseafloor horizons, horizon A, 209, and horizon B, 210, were interpreted and rendered surface models included in the report.

An artificially illuminated rendered surface was also prepared based on the same 3D seismic data from which FIG. 2 was prepared. The artificially illuminated rendered surfaces were prepared by selecting a loose grid on each horizon and utilizing an auto-picker to fill in data points.

Elevation data was then determined for each point based on expected velocities to generate a dense grid of elevation data for each surface. The dense grid of elevation data were then used to generate color-coded, artificially illuminated surface images. These images were then reproduced in hard-copy using a Tektronics 300 dpi dye sublimation printer. Surface features were then identified from these hard copies by visual inspection, and then the high resolution seismic sections were utilized to fully understand the relevant surface features.

Figure 3:
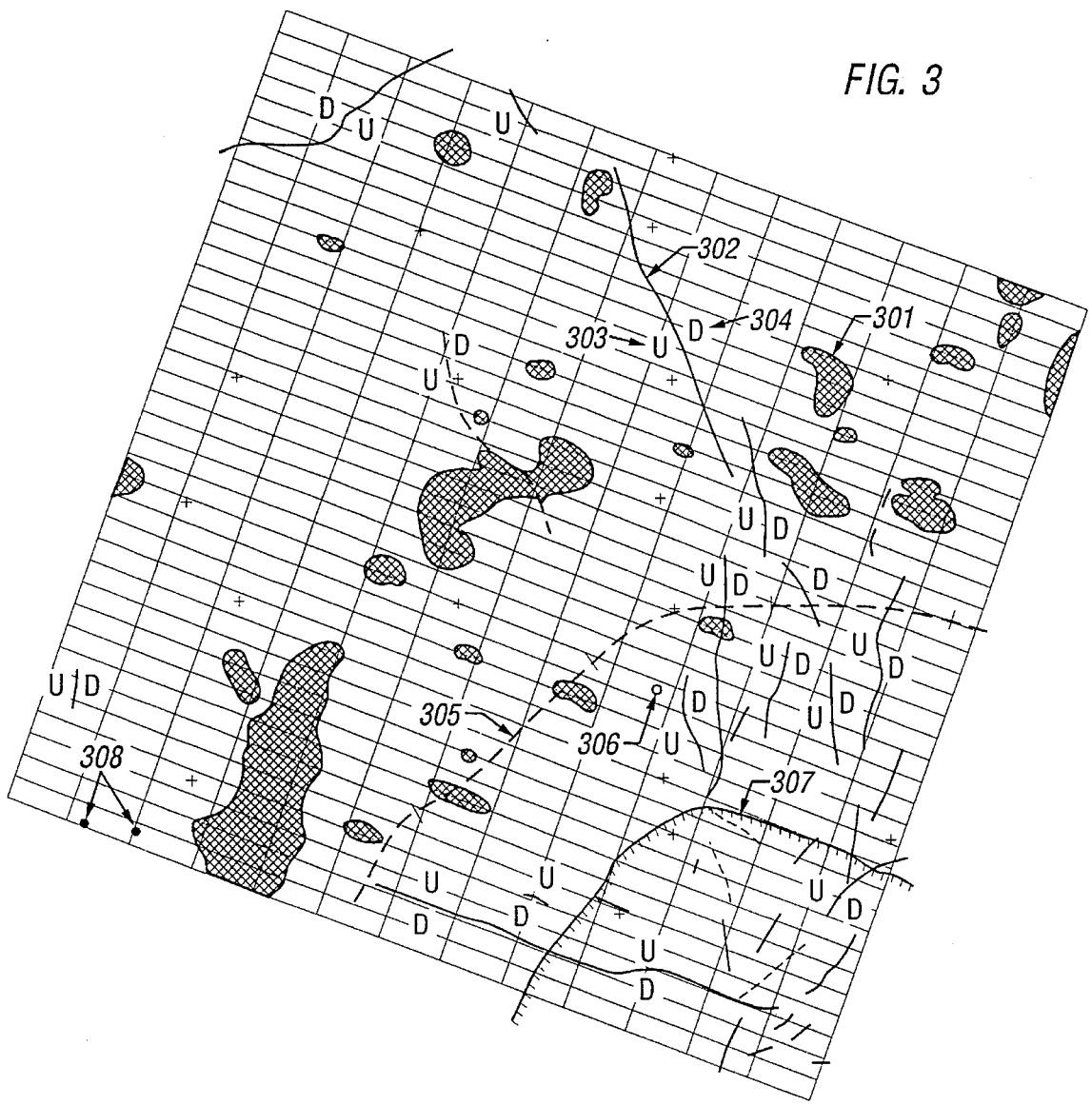
FIG. 3 is a map showing identified potential near-surface hazards in the vicinity of a proposed drilling site.

Referring now to FIG. 3, a map of surface features identified in this shallow hazard is shown. Similar maps were also prepared for horizon A and for horizon B. High-amplitude events are shown by shading such as shown in 301. Faults, 302, are shown with up, 303, and, 304, down sides marked. A sea floor valley is shown as dotted line 305. The proposed well site is shown as 306. An area of poor reflection, separated by line 307, is also identified. The location of the proposed well site was shown to be acceptable based on this study and result displayed such as in FIG. 3.

Lines for which high resolution seismic cross-sections are available are shown as lines 308. These lines were spaced about 1,500 feet apart in the NE-SW direction and about 500 feet apart in the NW-SE direction.

The foregoing description and example of the present invention is exemplary, and reference to the following claims is made to determine the scope of the present invention.

We claim:

1. A method to identify existence of near-surface drilling hazards in the vicinity of a sea floor location comprising the steps of:

obtaining 3D seismic data for the seafloor in the vicinity of the sea floor location;

preparing at least one high resolution 3D vertical profile from the 3D seismic data;

preparing an artificially-illuminated rendered surface based on the 3D seismic data; and identifying existence of near-surface hazards in the vicinity of the sea floor location by visual analysis of the rendered surface with reference to the high resolution 3D vertical profile.

2. The method of claim 1 wherein the high resolution 3D vertical profile is created by subsetting-data to data representing responses from sea floor to between about two and about three seconds below sea floor and applying hi-frequency boost and whitening.

3. The method of claim 1 further comprising the step of extracting elevation data from the dense grid of surface points.

4. The method of claim 1 wherein near-surface hazards in the vicinity of the seafloor location that are identified are selected from the group consisting of surface faults, debris slides, landslides, mudflows, salt structures, expulsion features, and carbonate build-ups.

5. The method of claim 1 wherein the seafloor location is located at least 800 feet below mean sea level.

6. The method of claim 1 wherein deep tow and geohazard surveys are not utilized to identify existence of near-surface hazards.

7. The method of claim 1 wherein near-surface drilling hazards are identified for drilling of a wild-cat well.

8. A method to identify existence of near-surface drilling hazards in the vicinity of a sea floor location comprising the steps of:

obtaining 3D seismic data for the seafloor in the vicinity of the sea floor location;

preparing one or more high resolution 3D vertical profile from the 3D seismic data wherein the high resolution 3D vertical profiles are created by subsetting data to data representing responses from sea floor to between about two and about three seconds below sea floor and applying hi-frequency boost and whitening;

preparing an artificially-illuminated rendered surface based on the 3D seismic data wherein the artificially illuminated rendered surface is prepared by creating water-bottom and sub-bottom horizons in time, creating a dense grid of surface point, and extracting elevation data from the dense grid of surface points; and identifying existence of near-surface hazards in the vicinity of the sea floor location by visual analysis of the rendered surface with reference to the high resolution 3D vertical profile.

9. The method of claim 8 wherein near-surface hazards in the vicinity of the seafloor location that are identified are selected from the group consisting of surface faults, debris slides, landslides, mudflows, salt structures, expulsion features, and carbonate build-ups.

10. The method of claim 8 wherein the seafloor location is located at least 800 feet below mean sea level.

11. The method of claim 8 wherein deep tow and geohazard surveys are not utilized to identify existence of near-surface hazards.

12. The method of claim 8 wherein near-surface drilling hazards are identified for drilling of a wild-cat well.

\* \* \* \* \*